United States Patent
Elgamil

(10) Patent No.: US 10,487,857 B2
(45) Date of Patent: Nov. 26, 2019

(54) DIRECT OPERATED HYDRAULIC SERVO VALVES

(71) Applicant: SCIENCE & TECHNOLOGY DEVELOPMENT FUND, Cairo (EG)

(72) Inventor: Mohamed Ahmed Elgamil, Haram (EG)

(*) Notice: Subject to any disclaimer, the term of this patent is extended or adjusted under 35 U.S.C. 154(b) by 84 days.

(21) Appl. No.: 15/562,911

(22) PCT Filed: Mar. 29, 2016

(86) PCT No.: PCT/EG2016/000009
§ 371 (c)(1),
(2) Date: Sep. 29, 2017

(87) PCT Pub. No.: WO2016/155750
PCT Pub. Date: Oct. 6, 2016

(65) Prior Publication Data
US 2018/0087542 A1    Mar. 29, 2018

(30) Foreign Application Priority Data

Apr. 2, 2015  (EG) .................................. 2015040503

(51) Int. Cl.
*F15B 13/04*    (2006.01)
*F16K 39/04*    (2006.01)
(Continued)

(52) U.S. Cl.
CPC ........ *F15B 13/0406* (2013.01); *F15B 13/029* (2013.01); *F16K 11/074* (2013.01);
(Continued)

(58) Field of Classification Search
CPC .... F15B 13/0406; F15B 13/029; F15B 13/02; F16K 11/0743; F16K 11/074; F16K 39/04; Y10T 137/86863; Y10T 137/86638
See application file for complete search history.

(56) References Cited

U.S. PATENT DOCUMENTS 2,451,575 A * 10/1948 Paxton .................... F15B 13/02
                                                         137/625.42
2,827,924 A *  3/1958 Towler .................. F16K 11/076
                                                         137/625.11

(Continued)

*Primary Examiner* — Mary E McManmon
*Assistant Examiner* — David Colon-Morales
(74) *Attorney, Agent, or Firm* — Wayne V. Harper

(57) ABSTRACT

A directional control and servo valve is provided. The valve includes a valve housing and a valving element. The valve housing includes a space, and a plurality of first cavities. The valving element includes two sides thereof. Each side includes a plurality of second cavities that corresponds the plurality of first cavities. The valving element includes plurality of webs formed in the plurality of second cavities. Each web separates the plurality of second cavities on each side from each other. The plurality of webs includes a plurality of holes adapted to connect the plurality of second cavities of both sides. The valving element is disposed in the space of the valve housing such that a plurality of control edges is configured that separates at least one first cavity with respective at least one second cavity to form control orifices that are symmetrical along both sides of the valving element.

5 Claims, 4 Drawing Sheets

(51) Int. Cl.
*F16K 11/074* (2006.01)
*F15B 13/02* (2006.01)

(52) U.S. Cl.
CPC ........ *F16K 11/0743* (2013.01); *F16K 39/045* (2013.01); *Y10T 137/86638* (2015.04); *Y10T 137/86863* (2015.04)

(56) References Cited

U.S. PATENT DOCUMENTS

| | | | | |
|---|---|---|---|---|
| 2,989,080 A * | 6/1961 | Dillberg | ............. | F16K 11/0743 137/625.65 |
| 2,990,853 A * | 7/1961 | Sharp | ............. | F15B 13/04 137/625.42 |
| 3,066,697 A * | 12/1962 | Chapman | ............. | F15B 13/07 137/625.65 |
| 3,190,313 A * | 6/1965 | Rumsey | ............. | F16K 3/10 137/625.21 |
| 3,207,180 A | 9/1965 | Mercier | | |
| 3,237,644 A * | 3/1966 | Beck | ............. | F15B 13/02 137/624.18 |
| 3,391,608 A * | 7/1968 | Huber | ............. | F01C 1/10 137/625.21 |
| 3,451,428 A * | 6/1969 | Pruett | ............. | F16K 11/0743 137/625.12 |
| 3,460,574 A * | 8/1969 | Risher | ............. | F16K 11/0743 137/625.21 |
| 3,542,071 A * | 11/1970 | Debbrecht | ............. | F15B 13/04 137/625.46 |
| 3,696,710 A * | 10/1972 | Ortelli | ............. | F03C 1/0444 91/487 |
| 3,742,979 A * | 7/1973 | Woodling | ............. | F16K 11/074 137/625.24 |
| 3,768,516 A | 10/1973 | Cyphelly | | |
| 3,892,259 A * | 7/1975 | McClocklin | ............. | F16K 11/0743 137/625.21 |
| 4,281,684 A * | 8/1981 | Broeg | ............. | F16K 11/074 137/625.21 |
| 4,823,550 A * | 4/1989 | Decker | ............. | F15B 13/0406 137/625.21 |
| 6,161,583 A * | 12/2000 | Morris | ............. | F15B 13/0406 137/625.21 |
| 7,819,948 B2 * | 10/2010 | Wagner | ............. | C01B 13/0259 137/616.7 |
| 9,010,370 B2 * | 4/2015 | Isenhour | ............. | F16K 3/30 137/625.15 |
| 9,109,824 B2 * | 8/2015 | Pawlik | ............. | F16K 11/074 |
| 2004/0187937 A1 * | 9/2004 | Kozuka | ............. | F15B 13/0406 137/625.21 |
| 2005/0194053 A1 | 9/2005 | Jeromson et al. | | |
| 2015/0090345 A1 * | 4/2015 | Olovsson | ............. | F16K 11/0743 137/15.06 |

* cited by examiner

US 10,487,857 B2

DIRECT OPERATED HYDRAULIC SERVO VALVES

TECHNICAL FIELD

The present invention relates to hydraulic control valves, and, more particularly to a direct operated hydraulic servo-valves.

BACKGROUND ART

Hydraulic directional control valves are used to direct the flow of oil in the hydraulic lines according to the working position taken by the valves. For example, a valve with four ports, with one port connected to the high oil pressure source, one port connected to the tank, and the other two ports connected to two sides of an actuator can assume three working position. In the first position, when the valve is not given any input signal, the valve takes the central position. If in this valve position the actuator is required to remain unmoving, the ports connected to the actuator should be closed. If the valve is supplied by an input signal to assume another working position, one of the actuator ports may be connected to the high oil pressure port while the other actuator port is connected to the tank, and the actuator consequently would move in one direction. When the valve receives another input signal to be in its third working position, the connections of the port are reversed and the actuator would move in the opposite position. The time required for the valve to move from one working position to the other is about one tenth of a second, and this time depends on whether the valve is a direct or pilot operated. In pilot operated valve, a pilot valve is used to actuate the main valve which controls the actuator to overcome the opposing forces that might restrict the motion of the main valve. The most widely used directional control valves are the spool valves that connect and disconnect the valve ports in different possible ways according to control requirements.

Hydraulic servo valves, and contrary to the directional control valves are characterized by the fact that their spools can assume infinite number of working position. This allows the servo valves to open partially, and allows the accurate control of the flow rate and/or the oil pressure, beside controlling the flow direction. The speed of response of the servo valve is much higher than that of the directional control valves with speed of response of about 0.01 seconds. This high accuracy and speed of response cannot be achieved without the high machining accuracy that results in a high production cost. Direct operated servo valves allow only low flow rates, and for the moderate and high flow rates pilot operated servo valves of high cost should be used.

A third type of valves with spools that can assume infinite number of working position, as in servo valves, but is of less accuracy, lower speed of response, and lower production cost is the proportional valves. A valve of the propositional type can replace several valves of the ON/OFF type.

SUMMARY OF THE INVENTION

There are always limits for the speed of response of the valving elements of the servo, proportional, or fast switching valves. These limits are attributed to the capacities of the actuators of the valve, which in most cases receive electric input signals, generate forces or torques that cause mechanical displacement of the valving elements. The generated forces or toques should overcome the forces aching on the valaving element such as the friction, flow and pressure farces. What remains after overcoming these forces is exploited in overcoming the valving element inertia, and the valve speed of response is determined according to this remaining part of the generated forces or toques. If the liquid flow rate is increased, the force to be overcome by the actuator increases and might reach to a value that can't be overcome by the actuator. In this case a pilot operated valve should be used, with a pilot valve driven by the actuator and controlling the main valve. At certain higher flow rates, more pilot stages are to be used. The increase of the speed of response of the valves and the flow rates that can pass through them, would reduce the needed number of pilot stage and improve the valves performance. Thus, there is a need to improve the speed of response and increase the allowable flow rates of direct operated valves to replace pilot operated valves or to be used as pilot stages with better performance for pilot operated valves. These improved direct operated valves can also be used as pilot stages for the on/off pilot operated directional control valves to transfer them to fast switching valves, with low production cost, that can be used in applications requiring fast and accurate control.

In view of the same, in one aspect, the present disclosure provides a directional control and servo valve. The directional control and servo valve may include a valve housing and a valving element. The valve housing includes a space, and a plurality of first cavities. Each first cavity of the plurality of first cavities incorporates a port for enabling liquid flow in the valve housing. Further, the valving element having two sides thereof. Each side includes a plurality of second cavities that corresponds the plurality of first cavities. The plurality of second cavities on each side are symmetrical to each other. The valving element includes plurality of webs formed in the plurality of second cavities. Each web separates the plurality of second cavities on each side from each other. The plurality of webs includes a plurality of holes adapted to connect the plurality of second cavities of both sides. The valving element is disposed in the space of the valve housing such that an assembly formed therebetween configures a plurality of control edges that separates at least one first cavity of the plurality of first cavities with respective at least one second cavity of the plurality of second cavities to form control orifices that are symmetrical along the both sides of the valving element. Further, the valving element is rotated along an axial direction thereof to uncover the control orifices to allow the liquid flow to pass therealong to divide the liquid flow in symmetrical pattern along the valving element. Furthermore, the liquid flow is also enabled along the both sides of the valving element through the plurality of holes.

BRIEF DESCRIPTION OF THE DRAWINGS

The new valve incorporates a valaving element that has cavities, which connect or disconnect the valve ports according to the valaving element position determined by the valve actuator. The valve actuator may be electrically driven by electromagnetic device or piezoelectric actuator or else. To realize large control orifices, despite that these actuators have generally short stokes and their driving forces or torques are of considerable values only for short displacements, the valving element motion in the new valve is rotational. A small angular displacement resulting from a rotary actuator as a torque motor or a linear actuator of high force acting on a short arm, would result in an appreciable circumferential displacement that increases with the radius increase. In other words, the actuator small angular displacement which occurs at a small radius is enlarged at the bigger radii, where the valve control orifices are formed. To increase the areas of the control orifices in order to increase the valve flow gain, a pair of symmetrical control orifices are used instead of a single control orifice. Each orifice of the pair of control orifices is formed on one edge at a side of the two sides of the valving element. The two control orifices on the two sides of the valving element are exactly symmetrical and aligned. The liquid flows through the cavities to the control orifices through the valving element itself. In addition to doubling the control orifice area by using two edges instead of one, two advantages are obtained. The first one is that the two sides of the valving element are subject to the same pressure, and thus it is statically balanced. Besides, symmetrical flows on the valving element edges result in lateral balanced flow forces on it, this makes the valving element motion easier, with lowest possible forces. The second advantage is that the cavities reduce the valving element mass and hence its moment of inertia. For the rigidity of the valving element, webs are used in the cavities. The webs have through holes in order to allow the liquid to flow between the two sides.

For flow passage to be large enough, they are formed as cavities in the valve housing, or as alternatively in fixed parts inside the valve, in addition to the cavities in the valving element.

With the proper design of the valving element, different types of ports connections in the valve working position can be realized to satisfy the needs of the different application.

In what follows, a valve with four ports shall be explained, as an example, but valves with two, three, or more ports can also be designed. Also, a valve with four ports closed in the central position and each two ports are connected in the other two working positions, is considered. Other valves with different methods of connecting the ports, as in the currently prevailing valves, can be designed.

Figure 1:
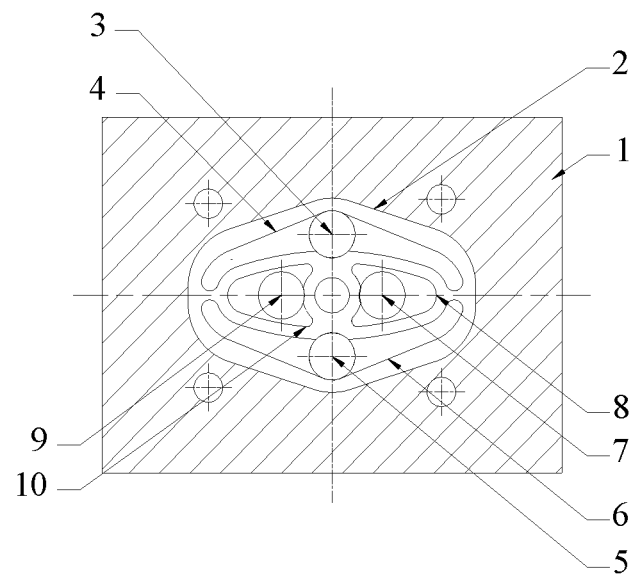
FIG. 1 Shows a section in the valve housing and its cavities and ports to be connected to the external lines.
Figure 4:
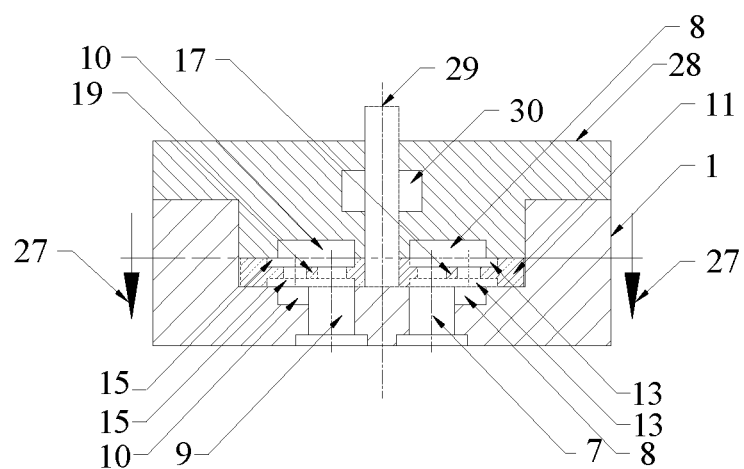
FIG. 4 Shows a section in the valve main parts with the ports and cavities.
Figure 5:
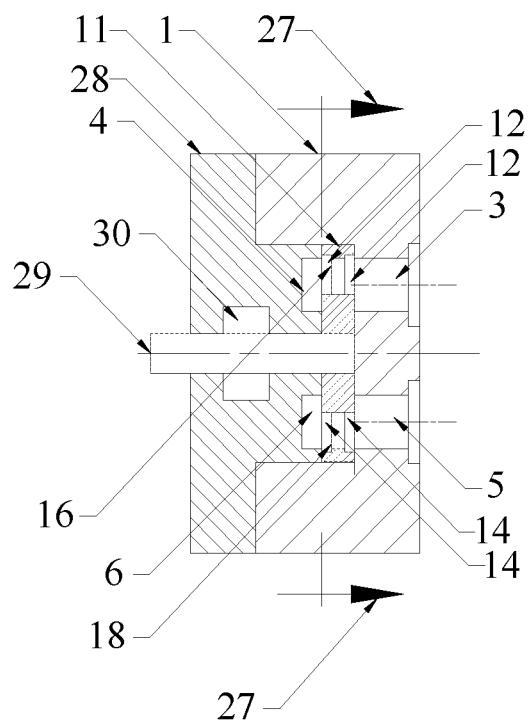
FIG. 5 Shows another section in the valve main parts with the ports and cavities.
Figure 6:
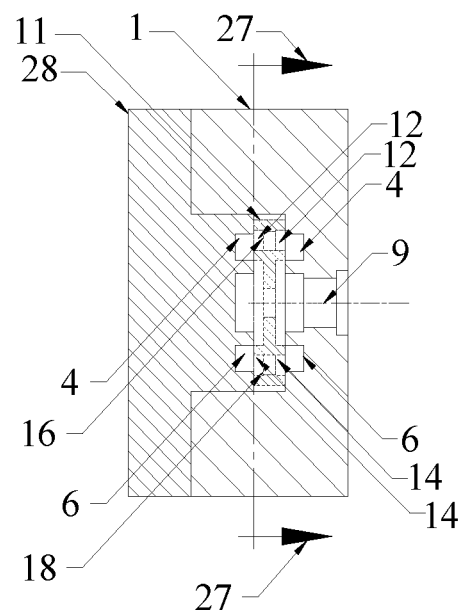
FIG. 6 Shows a third section in the valve main parts with the ports and cavities.

FIG. 1 presents a section in the valve (section (27) in FIGS. 4, 5, and 6). FIG. 1 shows the valve housing and the space (2) that contains the valving element (11). Port (3) is one of the valve ports through which the liquid flows inwards or outwards the valve. Standard openings for the valve (according to the porting pattern ISO 4401 or CETOP RP-121H, Size 6) are selected as an example, since this size is widely used as a direct operated valve and as the pilot stage in a pilot operated directional control valves. Generally, this port (3) is connected to the tank line, and the ports (7) and (9) are connected to the lines of an actuator, while the port (5) is connected to the liquid supply line of high pressure. Port (3) is connected to cavity (4), port (5) is connected to cavity (6), port (7) is connected to cavity (8), and port (9) is connected to cavity (10).

The cavities (4), (6), (8), and (10) can be formed in a separate piece placed beside the valving element. This would facilitate manufacturing and reduce the production cost.

Figure 2:
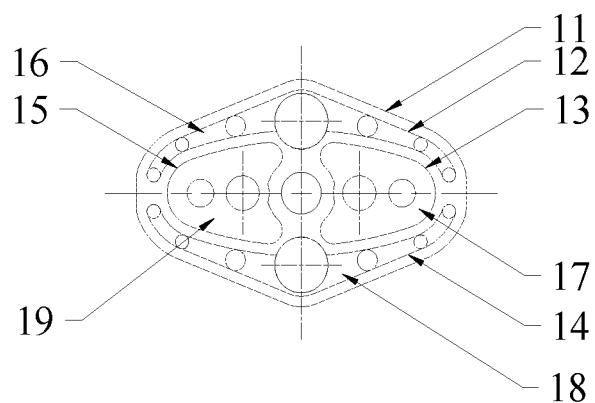
FIG. 2 Shows the valving element with its cavities, ports, and webs.

FIG. 2 shows the top view of the valving element (11), which has two identical cavities (12) on both sides, with the one of the upper surface only seen in the figure.

The details of these cavities are seen in frontal view sections in FIGS. 5 and 6. The valving element is symmetrical around a plane passing through its central mid position and it is nearly symmetrical around the longitudinal and lateral axes shown in the figure. The symmetry serves in reducing the production costs and helps in the static and dynamic balancing of the valving element but producing valves without this symmetry would not be a new idea different from what is presented in this patent. Cavity (12) corresponds to cavity (4) in valve housing, cavities (13) in the valving element correspond to cavity (8) in the valve housing, cavities (14) correspond to cavity (6) in the valve housing, and cavities (15) correspond to cavity (10) in the valve housing. Webs (16, 17, 18, and 19) exist in the cavities (12, 13, 14, and 15 respectively) for the valving element rigidity considerations. Each web separates two symmetrical cavities that have the same number, and the two cavities are connected through holes in the webs separating them.

Figure 3:
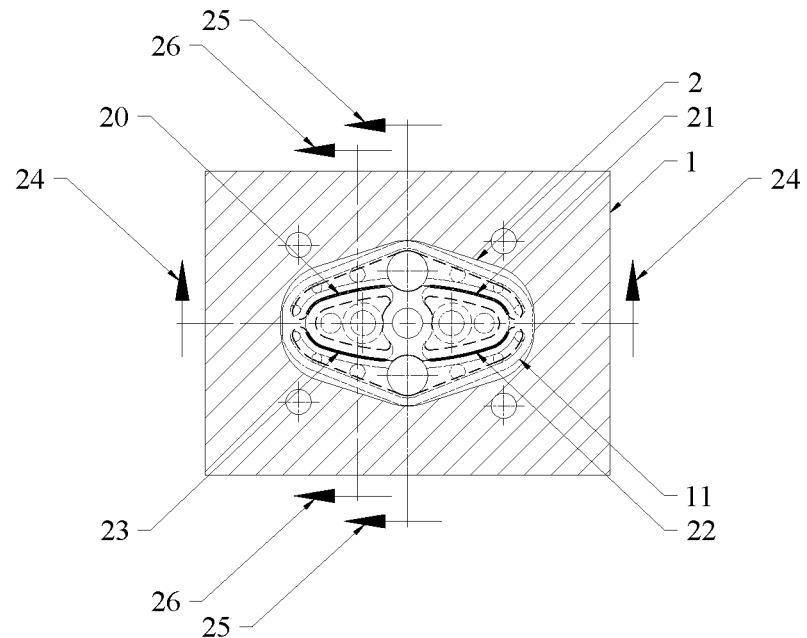
FIG. 3 Shows the valving element assembled in the housing, and the edges that form the control orifices.

FIG. 3 shows the details in section (27), with the valving element (11) assembled in housing (1) inside the cavity (2). The figure shows the edge (20) that separates the cavity (4) in housing (1) from the cavity (15) in the valving element (11), and the edge (21) that separates the cavity (4) in housing from the cavity in the valving element. As well as the edge (22) that separates the cavity (6) in the valve housing from the cavity (13) in the valving element. The figure depicts also the edge (23) that separates the cavity (6) in the valve housing from the cavity (15) in the valving element. Since the valve explained is of closed port in its central position, the edges are seen coinciding and the control ports are closed. The vertical cross sections (24), (25), and (26) are shown in FIGS. 4, 5, and 6 respectively.

FIG. 4 shows the front sectional view shown in FIG. 3. In this view, the load ports (7) and (9) are seen, as well as their connection to cavities (8) and (10) in the valve housing, respectively. The seen two cavities have identical cavities with the same numbers in the cover (28). The figure shows the two cavities (13) in the valving element (11) corresponding to the two cavities in (8) in the housing (1) and cover (28). The two cavities (13) in the valving element (11) are separated by the web (17) of two through holes. FIG. 4 also shows the two cavities (15) in the valving element (11) corresponding to the two cavities (10) in the housing (1) and cover (28). The two cavities (15) in the valving element (11) are separated by the web (19) of two through holes. The cavities lead the liquid and distribute it along the edges which form the control orifices. The depth of the cavities in the stationary ports is chosen larger than in the valving elements in order to increase the cross-sectional area of the flow passages and reduce loses. The reduced depth of the valving element is to reduce its mass and enhance its dynamics. Shaft (29) is used to rotate the valving element. Centering spring for shaft (29) can be used. Cavity (30) is exploited to collect the leakages and can be connected to the tank. Seals can be used to prevent the external leakages.

FIG. 5 shows the details of section (25) in FIG. 3. In this figure, the port (3) in the housing (1) which is usually connected to the tank, and the port (5) that is usually connected to the supply oil line, are seen. The ports (3) and (5) are connected to the cavities (4) and (6) in the housing (1) and cover (28) respectively. The two cavities (12) in the valving element (11) correspond to the two cavities (6) in the housing and cover. The figure shows the two webs (16) and (18).

FIG. 6 shows the section (26) depicted in FIG. 3. In this figure the valve port (9) in the valve housing (1), which is to be connected to an actuator side, is shown in addition to the details shown in FIG. 5.

Figure 7:
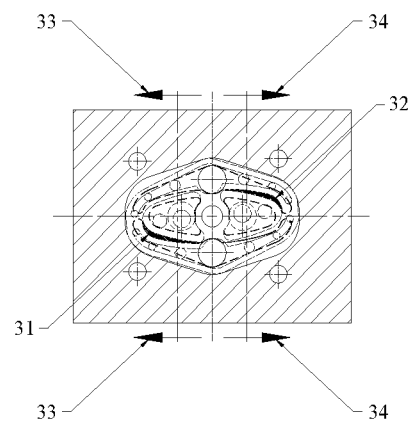
FIG. 7 Shows the valve housing and the valving element after being displaced angularly to open controls orifices.
Figure 8:
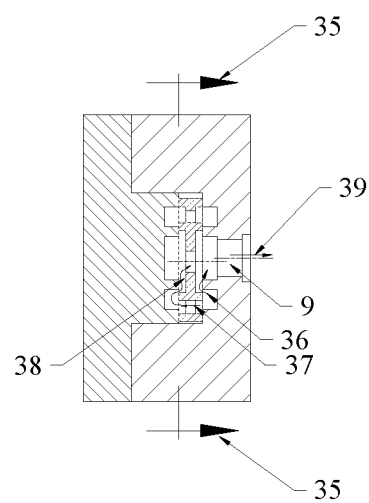
FIG. 8 Shows a section in an open valve and the liquid flow paths in the cavities and the different openings.
Figure 9:
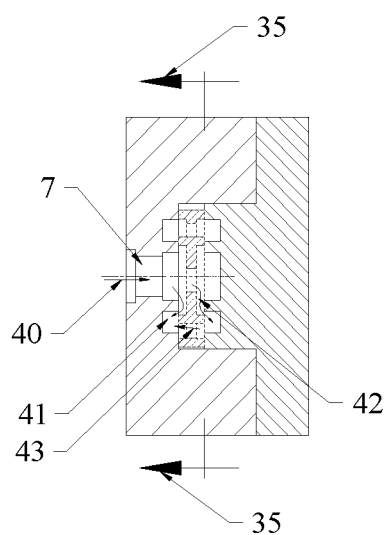
FIG. 9 Shows a section in an open valve and the other liquid flow paths in the cavities and the different openings.

FIG. 7 presents a sectional top view for the valve housing and the valving element (section (35) in FIGS. 8 and 9), with the valving element rotated to uncover the control orifices (31) and (32).

FIG. 8 show section (33) in FIG. 7. This section shows how opening (31) allows liquid flow to pass, as shown the arrow (36), from the supply port to the load port (9), and from there to the valve outlet as shown by arrow (39) to feed one of the actuators lines. The arrows (37) and (38) shows also the flow passing through the through holes in the webs towards port (9).

FIG. 9 shows section (34) in FIG. 7. It shows how opening (32) allows the liquid, as shown by arrows (41), (42), and (43) to flow from the valve outside, as in other words returning from the actuators through port (7), to the valve outlet port connected to the tank.

These valves are directional control valves that can replace the currently widely used directional control valves, but with higher speed of response which suits the applications demanding fast switching, they suit also applications in which digital control techniques are to be used. From this side, these valves can be viewed as servo valves. Furthermore, the valving element of a valve of this type can assume any position between its central and extreme position, and thus it can replace servo valves of the same size with a flow rate capacity higher than the servo valve. This would lead to replace a two-stage servo valve by a single stage valve of the presented type. Using a valve of the proposed type as a pilot valve would increase the speed of response of the pilot operated valve main stage. If used as a pilot valve for a conventional directional control valve, the whole valve would be a fast switching to be used in fast response control techniques, with relatively much lower cost.

What is claimed is:

1. A directional control and servo valve comprising: a valve housing having a space, and a plurality of first cavities, wherein each first cavity of the plurality of first cavities incorporates a port for enabling liquid flow in the valve housing; a valving element having two sides thereof, each side having a plurality of second cavities that corresponds to the plurality of first cavities, the plurality of second cavities on each side are symmetrical to each other; the valving element comprising a plurality of webs formed in the plurality of webs formed in the plurality of second cavities, each web of the plurality of webs separates the plurality of second cavities on each side from each other, the plurality of webs having a plurality of holes configured to connect the plurality of second cavities of the two sides; wherein the valving element is disposed in the space of the valve housing such that an assembly formed therebetween configures a plurality of control edges that separates at least one first cavity of the plurality of first cavities with respective at least one second cavity of the plurality of second cavities to form control orifices that are symmetrical along the two sides of the valving element, wherein the valving element is rotated along an axial direction thereof to uncover the control orifices to allow the liquid flow to pass therealong to divide the liquid flow in symmetrical pattern along the valving element, and wherein the liquid flow is also enabled along the two sides of the valving element through the plurality of holes.

2. The directional control and servo valve as claimed in claim 1, wherein the plurality of control edges forming the control orifices are formed between edges of the valving element along the two sides and edges of vicinity parts along which the valving element is disposed, and wherein an angular displacement fed to the valving element such that an area of the control orifice is proportional to a value of a feeding angle of the liquid flow.

3. The directional control and servo valve as claimed in claim 2, wherein the control orifices formed between the valving element cavities' edges and the corresponding cavities' edges of its vicinity parts are symmetrically distributed on the two sides of the valving element.

4. The directional control and servo valve as claimed in claim 1, wherein the plurality of second cavities in the valving element are configured to produce the same pressure on the two sides of the valving element.

5. The directional control and servo valve as claimed in claim 1 wherein the plurality of webs are configured to provide rigidity to the valving element.

* * * * *